United States Patent [19]
Suh

[11] Patent Number: 5,867,412
[45] Date of Patent: Feb. 2, 1999

[54] MODULAR MULTIPLICATION DEVICE FOR INFORMATION SECURITY

[75] Inventor: Chung Wook Suh, Daejon-Shi, Rep. of Korea

[73] Assignee: Electronics And Telecommunications Research Institute, Daejon-Shi, Rep. of Korea

[21] Appl. No.: 969,321

[22] Filed: Nov. 13, 1997

[30] Foreign Application Priority Data

Dec. 4, 1996 [KR] Rep. of Korea .................. 1996-61514

[51] Int. Cl.$^6$ ....................................................... G06F 7/38
[52] U.S. Cl. ............................ 364/746; 364/754; 380/28
[58] Field of Search .............................. 364/736.01, 746, 364/754.01–754.03, 757; 380/28, 30

[56] References Cited

U.S. PATENT DOCUMENTS

| | | | |
|---|---|---|---|
| 4,742,479 | 5/1988 | Kloker et al. | 364/746 |
| 4,816,805 | 3/1989 | Vojir et al. | 341/83 |
| 5,073,870 | 12/1991 | Morita | 346/746 |
| 5,144,574 | 9/1992 | Morita | 364/746 |
| 5,321,752 | 6/1994 | Iwamura et al. | 380/24 |
| 5,764,554 | 6/1998 | Monier | 364/746 |
| 5,793,659 | 8/1998 | Chen et al. | 364/746 |

FOREIGN PATENT DOCUMENTS 0 502 712 A2  9/1992  European Pat. Off. .......... G07F 7/10

*Primary Examiner*—Ayaz R. Sheikh
*Assistant Examiner*—Douglas S. Lee
*Attorney, Agent, or Firm*—Cohen, Pontani, Lieberman & Pavane

[57] ABSTRACT

The present invention relates to a modular multiplication device for information security which needs only the hardware almost half as much as required in a conventional modular multiplication device wherein multiplication and division circuits are separately used, by performing a dual function of multiplication and division with a binary adder. The modular multiplication device for information security in accordance with the present invention comprises binary addition means for performing a binary addition operation; two bit processing means for processing the output of the binary addition means; least significant two bit register means for sequentially storing least significant two bits; signed digit decoding means for generating a signed digit for a multiplier; result register means for storing a result value of the binary addition means; comparison means for comparing a result value of the result register with a modular value; decimal processing means for processing an output value for the modular value; multiplexing means for selecting output values of the decimal processing means and the signed digit decoding means; inverter means for inverting the multiplication/division selection signal; first AND gate means; second AND gate means; and third AND gate means.

2 Claims, 2 Drawing Sheets

MODULAR MULTIPLICATION DEVICE FOR INFORMATION SECURITY

BACKGROUND OF THE INVENTION

1. Field of the Invention

The present invention relates to a modular multiplication device used for technique of information security, and more particularly, to a modular multiplication device for information security which needs only the hardware almost half as much as required in a conventional modular multiplication device wherein multiplication and division circuits are separately used, by performing a dual function of multiplication and division with a binary adder.

2. Description of the Related Art

Recently, the implementation of the hardware directed to an information security algorithm with one chip has become a major issue. Particularly, the secrecy level of algorithms tends to be stressed in an attempt to enhance the function of information security as a result of the advance of the cryptanalysis technology. In order to enhance a secrecy level, it is becoming generalized to design algorithms by using a modular exponentiation calculation with a large amount of calculations. Since the calculation of a modular exponentiation consists of many modular multiplications, the implementation of a modular multiplication for enhancing the processing speed of an information security algorithm is becoming important. The modular multiplication needs a division function as well as a general multiplication function. With the conventional technique for implementing a modular multiplication, the required hardware was implemented so as to perform a modular multiplication function by combining the conventional multiplication and division circuits. According to this implementation method, the problem arises that an one-chip implementation is not viable because the hardware for implementing the information security algorithm with a key having a large amount of bits becomes bulky.

The conventional technique has been using a multiplication circuit for multiplying a multiplicand and a multiplier, and a division circuit for obtaining a modular value. This kind of multiplication method increases the amount of hardware. Thus, the amount of hardware is becoming large in applications such as an information security technique with the key having a large amount of bits. Further, since a costly semiconductor fabrication process, which results in a high integration density, must be used to implement with one chip, the cost required for manufacturing is expensive. The reliability is degraded due to the parasitic effect of the narrow-Channel process in implementing a large number of circuits on one chip.

SUMMARY OF THE INVENTION

It is therefore one object of the present invention to provide a modular multiplication device for information security which needs a small amount of hardware by performing a dual function of multiplication and division by using the same hardware.

It is another object of the present invention to provide a modular multiplication device for information security which can be implemented within one integrated circuit by using an inexpensive semiconductor manufacturing process since the required silicon area can be reduced due to the reduction of hardware.

It is still another object of the present invention to provide a modular multiplication device for information security whose price-competitive-power and reliability can be enhanced compared to other devices when the device is applied to the information security technique with a key having a large amount of bits.

In accordance with one aspect of the present invention, a modular multiplication device for information security is provided which comprises binary addition means for performing a binary addition operation; two bit processing means for processing the output of said binary addition means on a two bit basis; least significant two bit register means for sequentially storing least significant two bits; signed digit decoding means for generating a signed digit for a multiplier; result register means for storing a result value of the binary addition means; comparison means for comparing a result value of the result register with a modular value; decimal processing means for processing an output value for the modular value in accordance with an output of the comparison means; multiplexing means for selecting an output value of the decimal processing means and an output value of the signed digit decoding means according to a multiplication/division selection signal; inverter means for inverting the multiplication/division selection signal; first AND gate means responsive to outputs of the inverter means and the least significant two bit register means for outputting an input of the two bit processing means; second AND gate means responsive to an output of the two bit processing means and the multiplication/division selection signal for outputting an input of the least significant two bit register means; and third AND gate means responsive to an output of the binary addition means and the multiplication/division selection signal for outputting an output of the result register means.

When an information security algorithm using a key having a large amount of bits is implemented by hardware, the information security algorithm can be processed at a high speed. Thus, the advantage that the information security technique in application systems can be processed in real time can be obtained. In view of this, the implementation of hardware can be of a great importance in order to process the information security technique at a high speed. Particularly, in order to enhance the secrecy level of an information security technique, the implementation technique of the generally used modular multiplication device is being considered as a key technique for processing various information security techniques at a high speed. Thus, the present invention seeks to improve the conventional modular multiplication method. Particularly, in accordance with the present invention, one circuit serves as either a multiplication circuit or a division circuit to reduce the amount of required hardware of a modular multiplication device in contrast to the conventional technique wherein multiplication and division circuits are separately used.

BRIEF DESCRIPTION OF THE DRAWINGS

For fuller understanding of the nature and object of the invention, reference should be had to the following detailed description taken in conjunction with the accompanying drawings in which.

The present invention will become more apparent upon a detailed description of the preferred embodiments for carrying out the invention as rendered below. In the descriptions to follow, references will be made to the accompanying drawings, where like reference numerals are used to identify like or similar elements in the various drawings and in which.

Similar reference characters refer to similar parts in the several views of the drawings.

DETAILED DESCRIPTION OF THE INVENTION

The present invention seeks to improve the problem with the conventional method that the amount of hardware becomes large in implementing a modular multiplication device, which is a key arithmetic function of an information security algorithm using a key having a large amount of bits, by hardware. Thus, the present invention takes the following measures.

In general, a modular multiplication is performed by multiplying a multiplier and a multiplicand, and executing a division operation with respect to a modular value. The present invention commonly uses a binary adder circuit and a register to perform multiplication and division operations. In other words, when a multiplication operation is performed, a partial product of a multiplier corresponding to each bit of a multiplicand is sequentially added. The upper value is stored in a register for upper bits, and the lower value is stored in a register for lower bits. Then, in the same hardware, a modular multiplication is performed by subtracting a divisor from a register for lower bits while lower bits are sequentially added.

Figure 1:
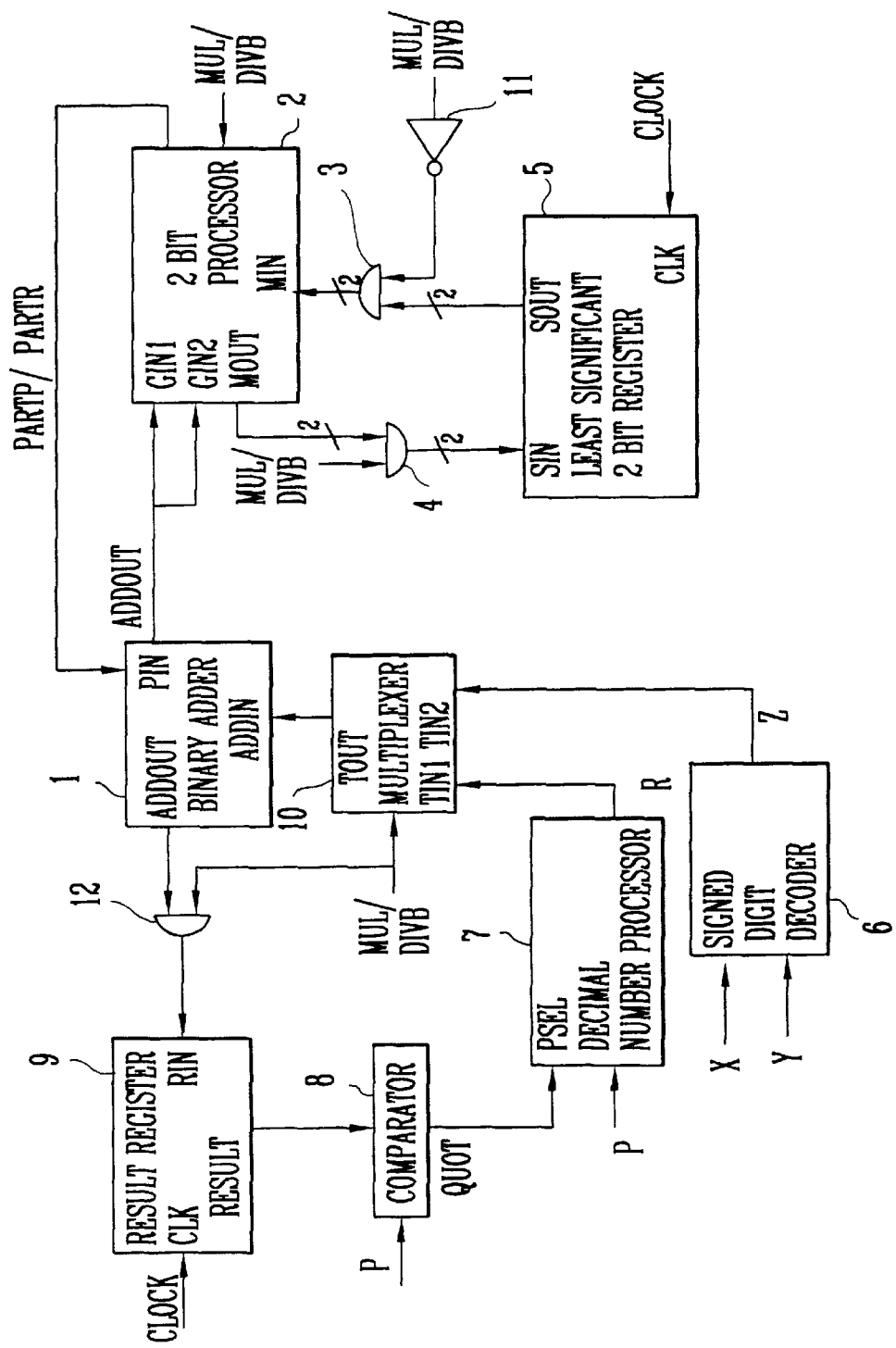
FIG. 1 illustrates a structure of a modular multiplication device in accordance with the present invention.

FIG. 1 illustrates a structure of a modular multiplication device in accordance with the present invention. In order to multiply a multiplicand X and a multiplier Y. the signal MUL/DIVB is set to 1, which sets an operation mode to a multiplication mode. In a signed digit decoder 6, the Booth modification algorithm is used to make a signed digit Z with respect to 2 bits of a multiplier.

The signed digit is applied to the input port TIN2 of a multiplexer 10. The signed digit Z is output to the output port TOUT of the multiplexer 10 by the signal MUL/DIVB which is set to 1. The signed digit Z in the output port TOUT is applied to the input port ADDIN of a binary adder 1. This value is added to a partial product PARTP/PARTR which is input to another input port PIN of the binary adder 1 to be input to the input port GIN1 of a 2 bit processor 2.

The 2 bit processor 2 eliminates the least significant 2 bits and inputs the remaining value PARTP/PARTR to the input port PIN of the binary adder 1 to make a partial product of the binary adder 1. The output port NOUT of athe2 bit processor 2 outputs the least significant 2 bits as an input of a second AND gate 4. This value is input to the input port SIN of a least significant 2 bit register 5 by a clock through the output of the second AND gate 4 by the signal MUL/DIVB which is set to 1. These steps are processed with respect to all bits of a multiplicand for every 2 bits within one clock period.

The division operation starts by setting the signal MUL/DIVB to 0 after the multiplication operation is completed. At this time, the final result value resulting from the multiplication operation in the binary adder 1 is input from the output port ADDOUT of the binary adder 1 to a third AND gate 12. This value is directly output to the third AND gate 12 by the signal MUL/DIVB, which is set to 0, to be input to the input port RIN of a result register 9 by a clock. The output value RESULT of the result register 9 is compared with a modular value P in a comparator 8. If the output value RESULT of the result register 9 is greater than or equal to the modular value P. the output QUOT of the comparator 8 becomes 1. On the other hand, the value RESULT is less than the modular value P, the output QUOT of the comparator 8 becomes 0. The output value QUOT of the comparator 8 is input to the input port PSEL of a decimal number processor 7 to control the output value R of the decimal number processor 7. If the output value QUOT of the comparator 8 is 1, the output value R becomes -P. If the output value QOUT of the comparator 8 is 0, the output value R becomes 0.

If the signal MUL/DIVB becomes 0, the output R of the decimal number processor 7 inputted to the input port TIN1 of the multiplexer 10 is output to the output port TOUT of the multiplexer 10, and is input to the input port ADDIN of the binary adder 1. This value is added to the output PARTP/PARTR of the 2 bit processor 2 in the binary adder 1. Then, if the output QUOT of the comparator 8 is 1, the binary adder 1 performs a substraction operation and 2 bit shift left. If the signal QUOT is 0, the output PARTP/PARTR of the 2 bit processor 2 is shifted 2 bit left without any operation.

On the other hand, if the signal MUL/DIVB becomes 0, the least significant 2 bits among the lower N bits which were stored in the least significant 2 bit register 5 and were obtained as a result of a multiplication operation is output through the output port SOUT of the least significant 2 bit register 5, and is input to the input of the first AND gate 3. These least significant 2 bits are input to the input port MIN of the 2 bit processor 2 by the signal MUL/DIVB which is set to 0. Note that the signal MUL/DIVB, which is set to 0, is inverted into 1 by an inverter 11.

The least significant 2 bits are added to the output data ADDOUT of the binary adder 1 which has been input to the input port GIN2 of the 2 bit processor 2. The added value is input to the input port PIN of the binary adder 1 on a next clock through the output port PARTP/PARTR of the 2 bit processor 2. The division function is performed on a 2 bit by 2 bit basis with respect to all bits of a dividend to obtain the final result of a modular multiplication operation for a modular value P.

Figure 2:
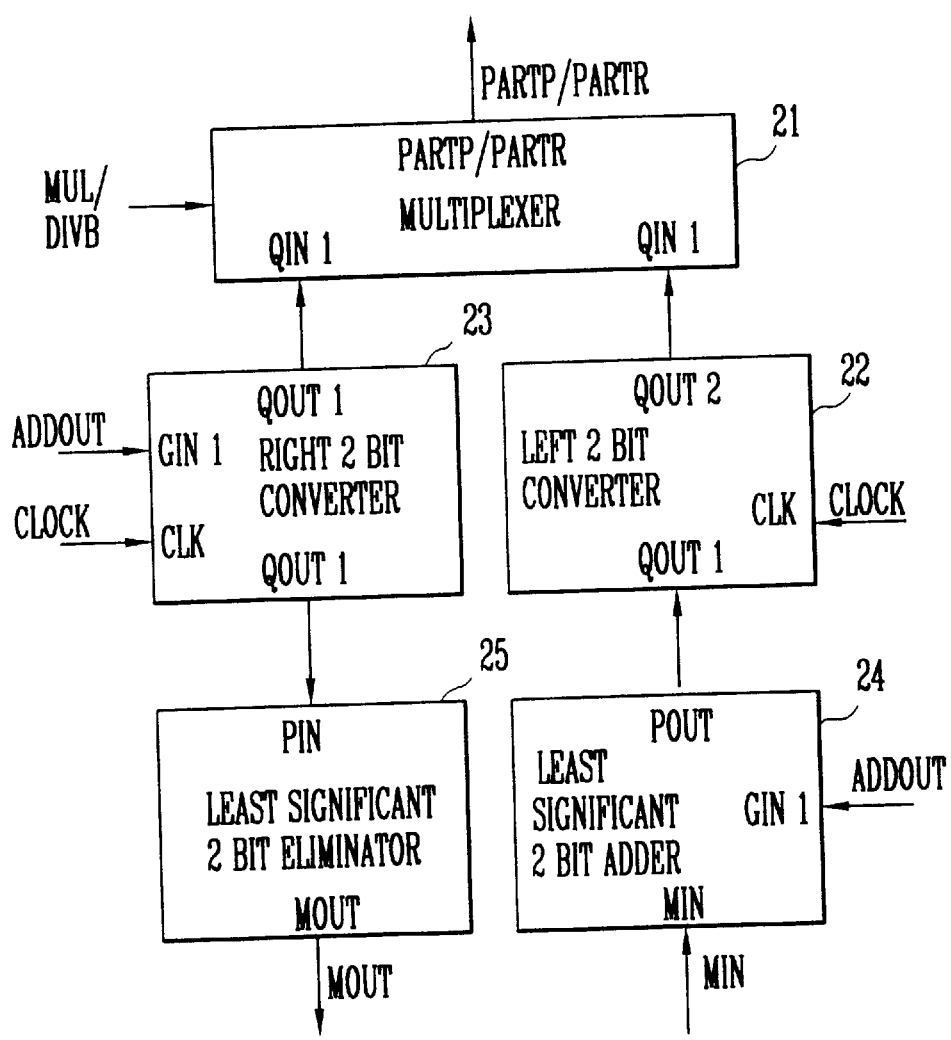
FIG. 2 illustrates a detailed structure of a 2 bit processor shown in FIG. 1.

FIG. 2 illustrates a detailed structure of a 2 bit processor shown in FIG. 1. When the device in accordance with the present invention performs a multiplication operation by having the signal MUL/DIVB set to 1, the output ADDOUT of the binary adder 1 shown in FIG. 1 is input to the input port GIN1 of a right 2 bit converter 23 and is shifted to the right for every 2 bits by a clock. The output EOUT of the right 2 bit converter 23 is input to the input port PIN of a least significant 2 bit eliminator 25 to eliminate the least significant 2 bits of the 2 bit shifted output. The output with the least significant 2 bits eliminated is transferred to the input of the second AND gate 4 through the output port MOUT.

Meanwhile, the output value which has been shifted by 2 bits is input to the input port QIN1 of the multiplexer 21 through the output port QOUT1 of the right 2 bit converter 23. The value at the input port QIN1 is input to the input port PIN of the binary adder 1 in FIG. 1 through the output port PARTP/PARTR of the multiplexer 21 by the signal MUL/DIVB which is set to 1.

When the device in accordance with the present invention performs a division operation by having the signal MUL/DIVB set to 0, the output SOUT of the least significant 2 bit register 5 in FIG. 1 is input to the input port MIN of a least significant 2 bit adder 24 via the first AND gate 3. The least significant 2 bits are added to the least significant bits of the output ADDOUT which has been input to the input port GIN2 of the least significant 2 bit adder 24 from the binary adder 1 in FIG. 1. The resulting value is input to a left 2 bit converter 22 via the output port BOUT and is shifted to the left by 2 bits by a clock. The shifted result is input to the input port QIN2 of the multiplexer 21 via the output port QOUT2 of the left 2 bit converter 22. The value at the input port QIN2 is input to the input port PIN of the binary adder 1 in FIG. 1 via the output port PARTP/PARTR of the multiplexer 21 by the signal MUL/DIVB which is set to 0.

As mentioned above, in accordance with the present invention, an adder circuit and a register are utilized to sequentially add a partial product of 2 bits of a multiplier when a multiplication operation is performed. Only the lower value is stored into the register for lower bits. When the division operation is performed, the stored value is sequentially added to the upper bits by the same hardware to sequentially subtract the value of a divisor for obtaining a remainder.

In other words, multiplication and division operations are performed by using the same hardware. Thus, when the information security algorithm for a key having a large number of bits is implemented in hardware, the algorithm can be implemented by one chip by using the conventional inexpensive semiconductor fabrication process. As a result, a price competitive power can be enhanced, and a reliability can be increased due to the reduction of the number of required transistors in accordance with the present invention.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. A modular multiplication device for information security, comprising:

binary addition means for performing a binary addition operation and outputting an addition output;

result register means for receiving and storing the addition output and outputting a result register output;

first AND gate means for transmitting the addition output to said result register means in response to the addition output and a multiplication/division selection signal;

comparison means for receiving the result register output, comparing the result register output with a modular value and outputting a comparison output;

decimal processing means for processing the comparison output and the modular value and outputting a decimal processing output;

signed digit decoding means for receiving a multiplier and a multiplicand and outputting a signed digit for a multiplier;

multiplexing means for selecting one of the decimal processing output and the signed digit for a multiplier and outputting a multiplexing output to said binary addition means in response to the multiplication/division selection signal;

two bit processing means for processing the binary addition means output on a two bit basis and outputting a two bit processing output;

least significant two bit register means for sequentially storing least significant two bits of the two bit processing output and outputting a least significant two bit register output;

second AND gate means for receiving the two bit processing output and the multiplication/division selection signal and transmitting an input to said least significant two bit register means;

inverter means for inverting the multiplication/division selection signal; and third AND gate means for receiving the inverted multiplication/division selection signal and a least significant two bit register output and outputting an input to said two bit processing means.

2. The device of claim 1, wherein said two bit processing means further comprises:

right two bit conversion means for shifting the addition output to the right by two bits in response to a clock signal and outputting a right two bit conversion output;

least significant two bit elimination means for eliminating a least significant two bits of the right two bit conversion output and transmitting a remainder of the right two bit conversion output to said least significant two bit register means for storage;

least significant two bit addition means for adding the least significant two bit register output to the addition output and outputting a least significant two bit addition output;

left two bit conversion means for shifting the least significant two bit addition output to the left by two bits and outputting a left two bit conversion output; and multiplexing means for transmitting one of the left two bit conversion output and the right two bit conversion output to the binary addition means in response to the multiplication/division selection signal.

* * * * *